United States Patent
Hwang

(10) Patent No.: US 12,456,749 B2
(45) Date of Patent: Oct. 28, 2025

(54) BATTERY CELL ACTIVATION METHOD AND BATTERY CELL MANUFACTURING METHOD COMPRISING SAME

(71) Applicant: LG ENERGY SOLUTION, LTD., Seoul (KR)

(72) Inventor: Gyu Ok Hwang, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 572 days.

(21) Appl. No.: 17/789,596

(22) PCT Filed: Nov. 4, 2021

(86) PCT No.: PCT/KR2021/015938
§ 371 (c)(1),
(2) Date: Jun. 28, 2022

(87) PCT Pub. No.: WO2022/103076
PCT Pub. Date: May 19, 2022

(65) Prior Publication Data
US 2023/0049301 A1    Feb. 16, 2023

(30) Foreign Application Priority Data
Nov. 16, 2020  (KR) .................. 10-2020-0152525

(51) Int. Cl.
*H01M 10/04*  (2006.01)

(52) U.S. Cl.
CPC ..... *H01M 10/0481* (2013.01); *H01M 10/049* (2013.01)

(58) Field of Classification Search
CPC ........... H01M 10/0481; H01M 10/049; H01M 50/394; H01M 50/105; H01M 10/04;
(Continued)

(56) References Cited

U.S. PATENT DOCUMENTS

| 12,136,709 B2 * | 11/2024 | Lee ..................... H01M 10/443 |
| 2002/0023339 A1 * | 2/2002 | Mizutani ............. H01M 10/049 429/300 |

(Continued)

FOREIGN PATENT DOCUMENTS

| CN | 103262301 A | 8/2013 |
| CN | 104810539 A | 7/2015 |

(Continued)

OTHER PUBLICATIONS

Machine translation of KR20150062849A description.*

(Continued)

*Primary Examiner* — Matthew T Martin
*Assistant Examiner* — Felicity B Alban
(74) *Attorney, Agent, or Firm* — Birch, Stewart, Kolasch & Birch, LLP

(57) ABSTRACT

A method of activating a battery cell and a method of manufacturing a battery cell including the same, and more particularly, to a battery cell activation method capable of easily discharging gas trapped between a separator and an electrode inside an electrode assembly of a battery cell, and preventing discharge of a large amount of electrolyte solution during a gas discharging process, and a method of manufacturing a battery cell including the same.

10 Claims, 9 Drawing Sheets

(58) Field of Classification Search
CPC .. H01M 10/058; H01M 50/116; H01M 50/30; Y02E 60/10; Y02P 70/50
See application file for complete search history.

(56) References Cited

U.S. PATENT DOCUMENTS

| | | | |
|---|---|---|---|
| 2013/0312869 A1 | 11/2013 | Klien et al. | |
| 2016/0161564 A1 | 6/2016 | Kurihara et al. | |
| 2016/0336593 A1* | 11/2016 | Honda | H01M 4/386 |
| 2019/0214675 A1 | 7/2019 | Christensen et al. | |
| 2019/0379083 A1 | 12/2019 | Jung et al. | |

FOREIGN PATENT DOCUMENTS

| | | | | |
|---|---|---|---|---|
| CN | 109478674 A | 3/2019 | | |
| CN | 110419132 A | 11/2019 | | |
| CN | 210110979 U | 2/2020 | | |
| CN | 106602161 B | 3/2020 | | |
| CN | 111052475 A | 4/2020 | | |
| EP | 3 051 621 A1 | 8/2016 | | |
| JP | 2007-287446 A | 11/2007 | | |
| JP | 2013-140782 A | 7/2013 | | |
| JP | 2014-110246 A | 6/2014 | | |
| JP | 2016-225237 A | 12/2016 | | |
| JP | 2017-69079 A | 4/2017 | | |
| JP | 6125016 B2 | 5/2017 | | |
| KR | 10-2013-0134963 A | 12/2013 | | |
| KR | 10-2014-0004662 A | 1/2014 | | |
| KR | 10-2014-0068551 A | 6/2014 | | |
| KR | 10-2015-0062849 A | 6/2015 | | |
| KR | 10-2017-0101582 A | 9/2017 | | |
| KR | 10-1793162 B1 | 11/2017 | | |
| KR | 10-2018-0025804 A | 3/2018 | | |
| KR | 20180025805 A * | 3/2018 | | |
| KR | 10-2018-0061665 A | 6/2018 | | |
| KR | 10-2018-0082759 A | 7/2018 | | |
| KR | 10-2018-0093792 A | 8/2018 | | |
| KR | 10-2019-0031847 A | 3/2019 | | |
| KR | 10-2020-0051377 A | 5/2020 | | |
| WO | WO-2019054837 A1 * | 3/2019 | H01M 10/04 | |

OTHER PUBLICATIONS

Machine translation of KR20180061665A description.*
Machine translation of KR20180025805.*
Machine translation of KR20170101582.*
International Search Report for PCT/KR2021/015938 mailed on Feb. 18, 2022.
Extended European Search Report for European Application No. 21892244.1, dated Oct. 31, 2023.
Chinese Office Action and Search Report for Chinese Application No. 202180008060.6, dated May 26, 2025, with English translation of the Office Action.

* cited by examiner

[FIG. 1]　　　　　　　　CONVENTIONAL ART
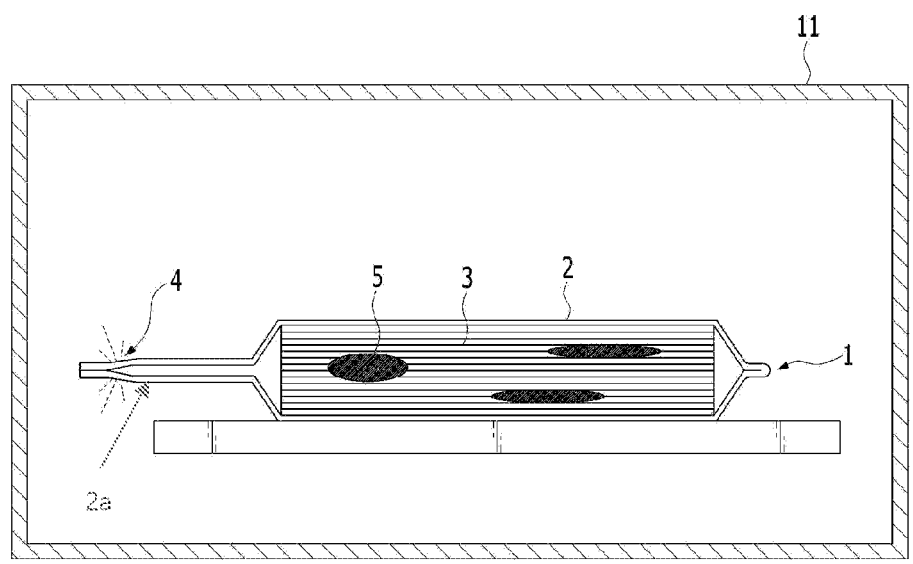

[FIG. 2] CONVENTIONAL ART
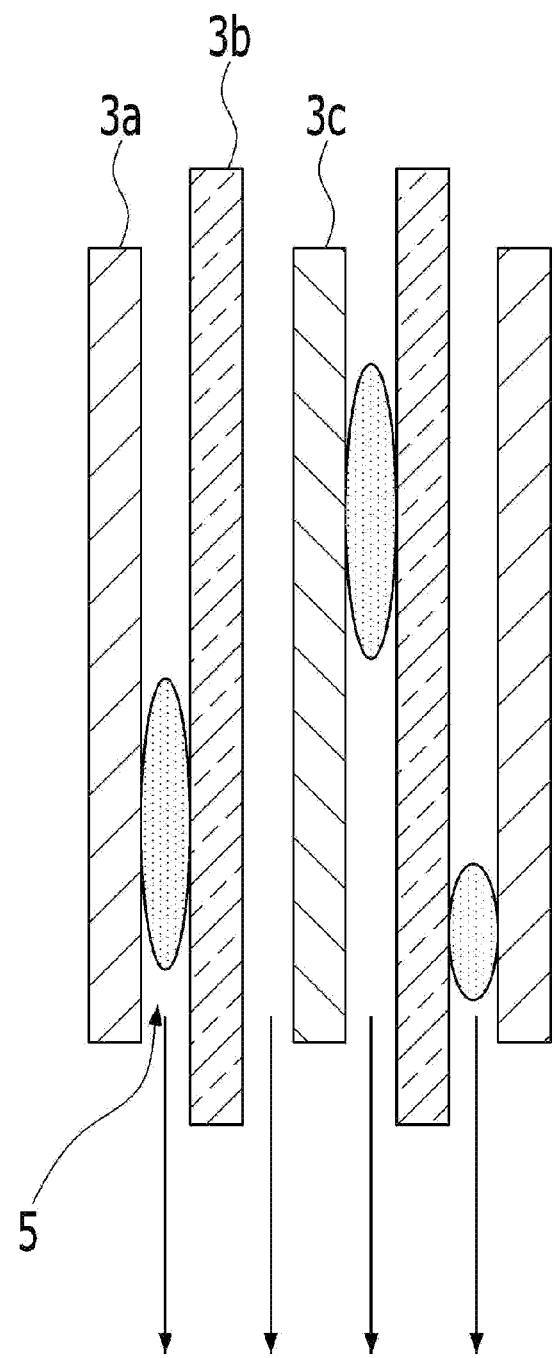

[FIG. 3]
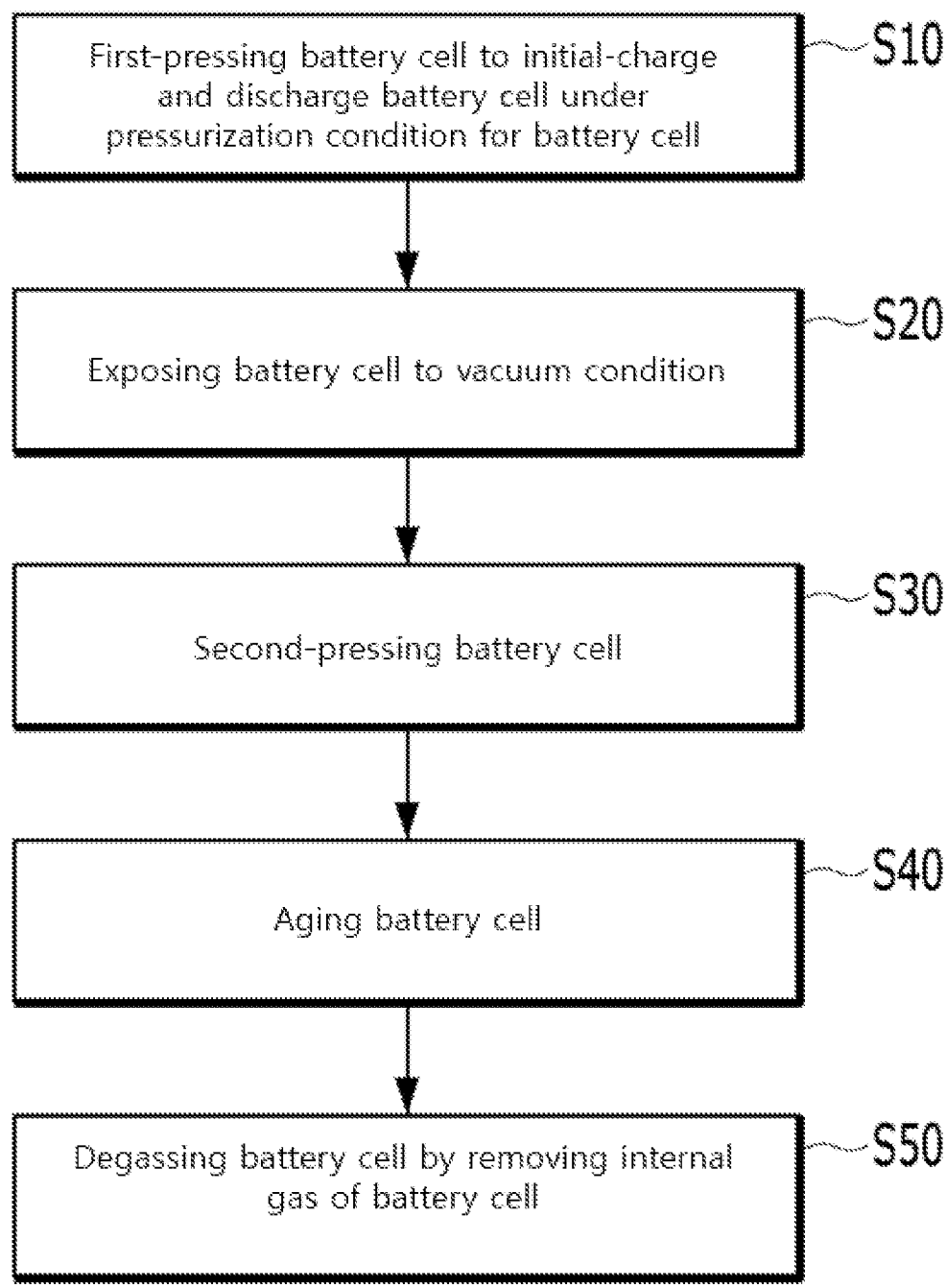

[FIG. 4]
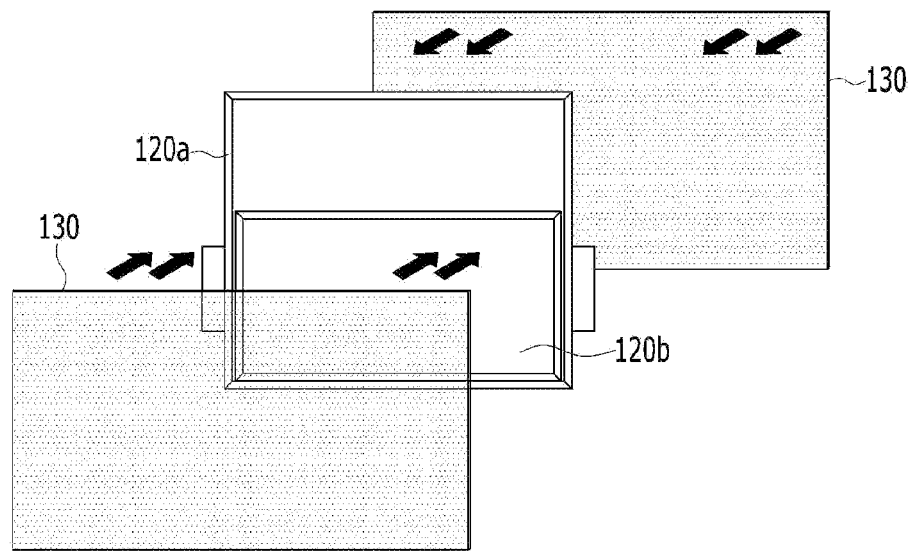

[FIG. 5]
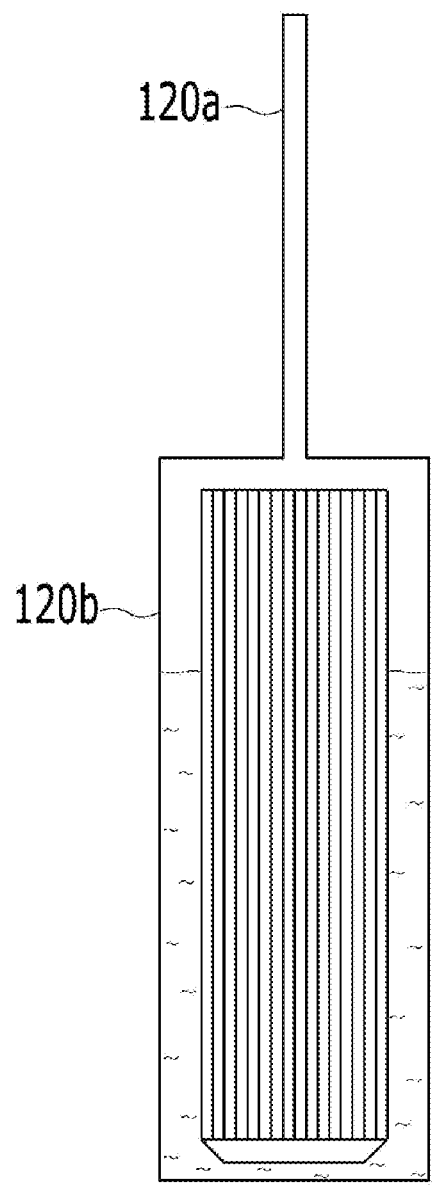
100:120a,120b

[FIG. 6]
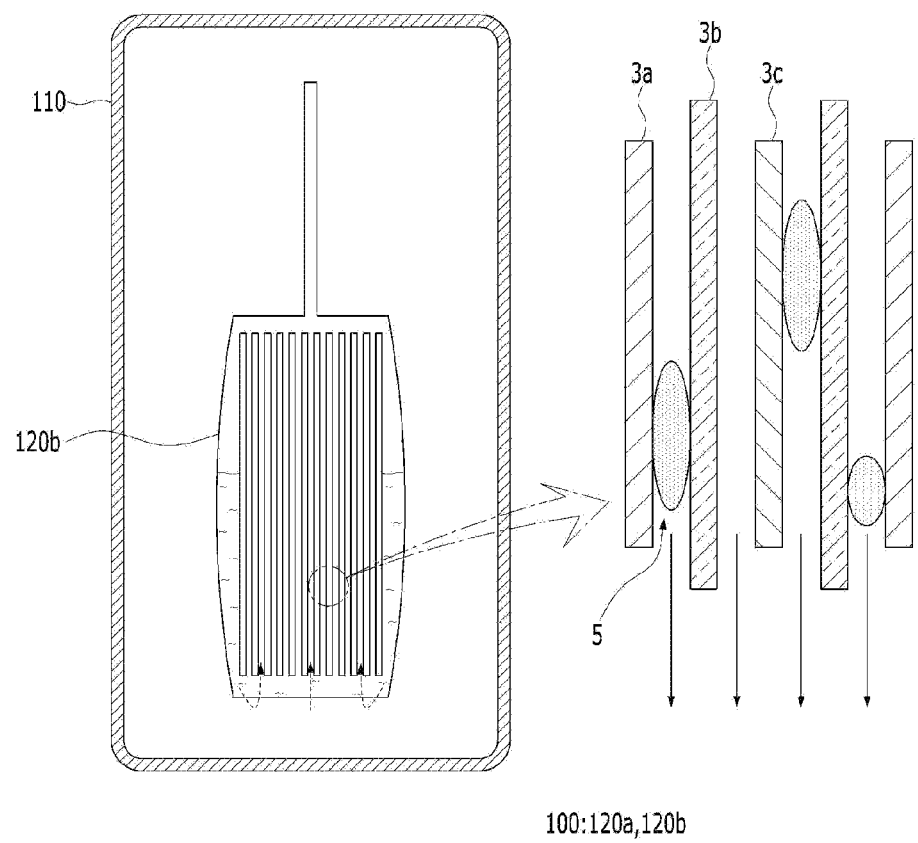
100:120a,120b

[FIG. 7]
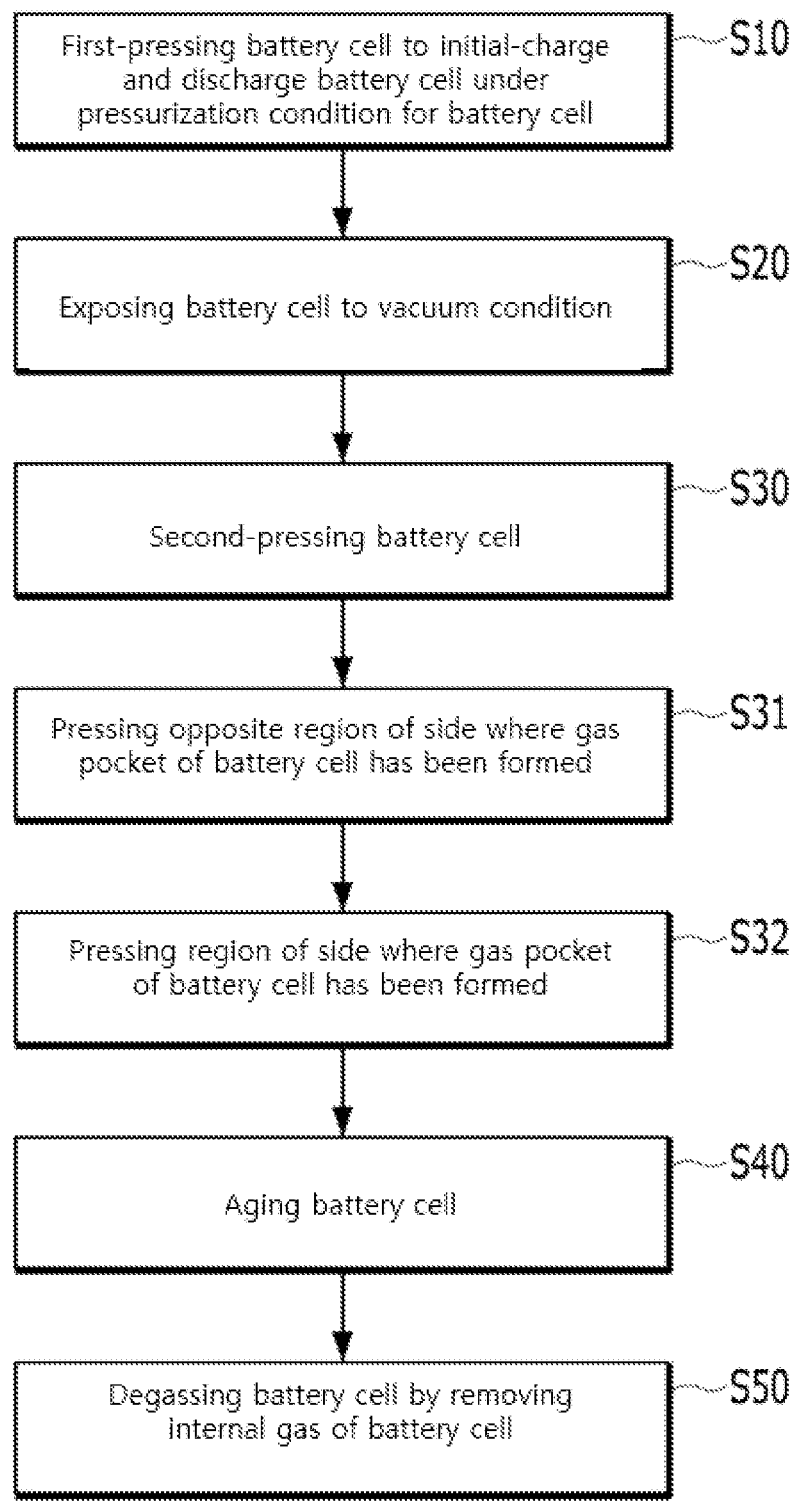

[FIG. 8]
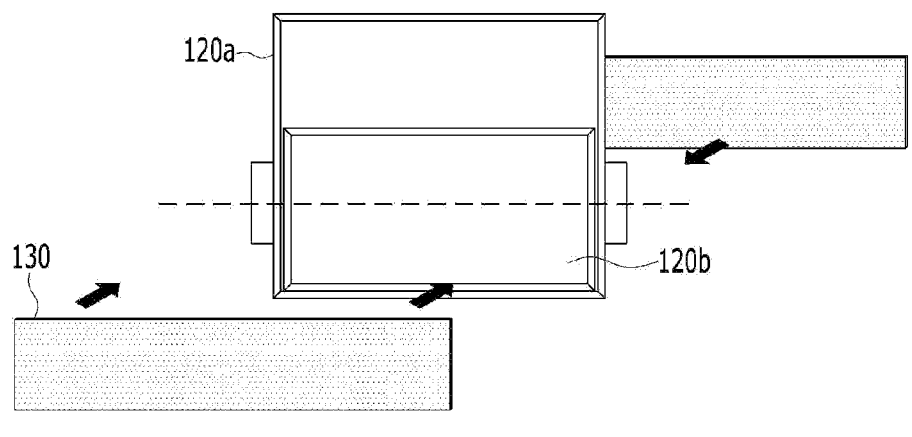

[FIG. 9]
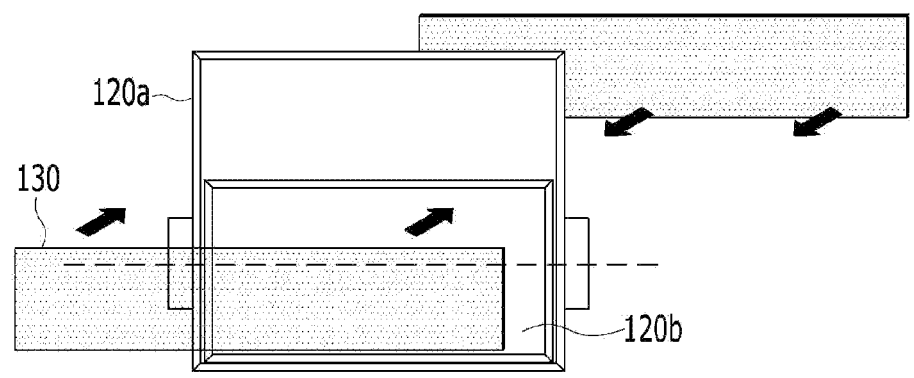
100:120a,120b

BATTERY CELL ACTIVATION METHOD AND BATTERY CELL MANUFACTURING METHOD COMPRISING SAME

TECHNICAL FIELD

This application claims the benefit of priority based on Korean Patent Application No. 10-2020-0152525, filed on Nov. 16, 2020, and the entire contents of the Korean patent application are incorporated herein by reference.

The present invention relates a method of activating a battery cell and a method of manufacturing a battery cell including the same, and more particularly, to a method of activating a pouch-type battery cell, and a method of manufacturing a battery cell including the same.

BACKGROUND ART

Generally, the method of manufacturing a pouch-type secondary battery includes injecting an electrolyte solution through an electrolyte solution injection unit positioned at one side of a prepared pouch-type edge region, performing charge and discharge after first-sealing the electrolyte solution injection unit along a first sealing line, performing cutting along a cutting line positioned inside the first sealing line, performing degassing, second-sealing the electrolyte solution injection unit, and cutting part of the electrolyte solution injection unit along the cutting line positioned outside the second-sealing line.

FIG. 1 is a cross-sectional view schematically showing a degassing process performed by a conventional method of manufacturing a battery cell, and FIG. 2 is a cross-sectional view specifically showing a state in which activated gas is trapped between an electrode and a separator in FIG. 1.

First, referring to FIG. 1, in the degassing process for removing gas generated during the activation process by charge and discharge, gas is collected in a gas pocket unit 2a by pressing a cell including a pouch case 2 and an electrode assembly 3 inside the chamber 11, and a degassing hole 4 is then formed by piercing the gas pocket unit 2a. Thereafter, by making the inside of the chamber 11 become vacuum, the activation gas inside the pouch case 2 is removed by discharging the activation gas to the outside through the degassing hole 4.

However, as illustrated in FIG. 2, there is a limit in enhancing the degassing efficiency because it is difficult for gas 5, which is trapped between the electrodes 3a and 3c and the separator 3b, to be easily discharged.

Further, the discharge of gas inside the battery cell 1 may be maximized during the process of pressing the battery cell 1, but the discharge amount of the electrolyte solution existing in the cell also increases. On the other hand, it takes a long time until the electrolyte solution discharged by the pressure is absorbed into the electrode and the separator, and if the electrolyte solution is not sufficiently absorbed in the electrode and the separator, the quality of the battery cell is deteriorated.

Hence, there a need for a technology for easily discharging gas remaining in the battery cell during the degassing process and preventing discharge of a large amount of electrolyte solution during the degassing process.

DISCLOSURE

Technical Problem

The present invention is believed to solve at least some of the above problems. For example, an aspect of the present invention provides a battery cell activation method capable of easily discharging gas trapped between a separator and an electrode inside an electrode assembly of a battery cell, and preventing discharge of a large amount of electrolyte solution during a gas discharging process, and a method of manufacturing a battery cell including the same.

Technical Solution

The present invention provides a method of activating a battery cell. In one example, a method of activating a battery cell according to the present invention includes: first-pressing the battery cell to initial-charge and discharge the battery cell under a pressurization condition for the battery cell; exposing the battery cell to a vacuum condition; second-pressing the battery cell; aging the battery cell; and degassing the battery cell by removing internal gas of the battery cell. At this time, a pressure P2 applied to the battery cell during the second-pressing of the battery cell is lower than a pressure P1 applied to the battery cell during the first-pressing of the battery cell.

In one example, the pressure P1 applied to the battery cell during the first-pressing of the battery cell and the pressure P2 applied to the battery cell during the second-pressing of the battery cell satisfy a following condition 1:

[Condition 1]

$0.5 \leq P1/P2 \leq 10$

Herein, P1 denotes an average pressure (kgf/cm$^2$) which is applied to press the battery cell during the first-pressing of the battery cell, and P2 denotes an average pressure (kgf/cm$^2$) which is applied to press the battery cell during the second-pressing of the battery cell.

In one example, the pressure P2 applied to the battery cell during the second-pressing of the battery cell is in a range of 0.5 to 3 kgf/cm$^2$ on average.

In a specific example, the second-pressing of the battery cell includes: pressing a first region on a side of the battery cell opposite to where a gas pocket of the battery cell has been formed; and pressing a second region on a side of the battery cell where the gas pocket of the battery cell has been formed.

Herein, the second-pressing of the battery cell includes discharging the internal gas of the battery cell by sequentially pressing the battery cell from a first side to a second side opposite the first side. At this time, the second-pressing of the battery cell is performed using a pressing roller.

In one example, the first-pressing of the battery cell is performed by pressing two surfaces of the battery cell using pressing plates.

Further, the exposing of the battery cell to the vacuum condition is performed by depressurizing an interior of a chamber in a state that the battery cell is positioned inside the chamber. In a specific example, the exposing of the battery cell to the vacuum condition is performed by repeating a venting process of discharging gas inside the chamber n times in the state that the battery cell is positioned in the chamber. Herein, n is an integer between 2 and 50.

Further, a width of the vacuum chamber is greater than a width of the battery cell.

Further, the present invention provides method of manufacturing a battery cell including the above-described process of activating a battery cell. In one example, the method of manufacturing a battery cell according to the present invention includes activating the battery cell using the method of activating a battery cell. Further, the battery cell is a pouch-type battery cell and has a gas pocket connected to an inside of the battery cell at one side.

In a specific example, the method further includes sealing the battery cell and removing the gas pocket, after the activating of the battery cell.

Advantageous Effects

Hence, according to a method of activating a battery cell and a method of manufacturing a battery cell including the same of the present invention, gas, which is trapped between a separator and an electrode inside an electrode assembly of a battery cell, can be easily discharged. Further, in the activation method of the battery cell, it is possible to prevent discharge of a large amount of electrolyte solution during the pressing process of the battery cell by including first and second pressing steps.

BRIEF DESCRIPTION OF THE DRAWINGS

FIG. 1 is a cross-sectional view schematically showing a degassing process performed by a conventional method of manufacturing a battery cell.

FIG. 2 is a cross-sectional view specifically showing a state in which activated gas is trapped between an electrode and a separator in FIG. 1.

FIG. 3 is a flowchart of a method of activating a battery cell according to one embodiment of the present invention.

FIG. 4 is a diagram schematically showing a first-pressing step in a battery cell activation method according to one embodiment of the present invention.

FIGS. 5 and 6 are diagrams schematically showing a state before and after a vacuum step in a battery cell activation method according to one embodiment of the present invention.

FIG. 7 is a flowchart of a method of activating a battery cell according to another embodiment of the present invention.

FIGS. 8 and 9 schematically show a lower pressing step and an upper pressing step in a second-pressing step of a battery cell activation method according to another embodiment of the present invention.

DETAILED DESCRIPTION OF THE PREFERRED EMBODIMENTS

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

The present invention provides a method of activating a battery cell and a method of manufacturing a battery cell including the same.

Conventionally, in a method of manufacturing a pouch-type secondary battery, in the degassing process for removing gas generated during the activation process by charge and discharge, gas is collected in a gas pocket unit by pressing a cell including a pouch case and an electrode assembly inside the chamber, and a degassing hole is then formed by piercing the gas pocket unit. Thereafter, by making the inside of the chamber become vacuum, the activation gas inside the pouch case is removed by discharging the activation gas to the outside through the degassing hole. However, it was difficult for gas, which had been trapped between the electrode and the separator, to be smoothly discharged to the outside, and a large amount of electrolyte solution, which existed inside the cell, was discharged during the process of pressing the battery cell.

As such, the present invention provides a method of activating a battery cell and a method of manufacturing a battery cell including the same. Specifically, in the battery cell activation method according to the present invention, gas remaining in the battery cell may be easily discharged by including the first and second pressing steps. Particularly, the pressure P2 applied to the battery cell during the second-pressing of the battery cell is set to be lower than the pressure P1 applied to the battery cell during the first-pressing of the battery cell in order to prevent discharge of a large amount of electrolyte solution during the degassing process.

Hereinafter, a method of activating a battery cell and a method of manufacturing a battery cell including the same according to the present invention will be described.

FIG. 3 is a flowchart of a method of activating a battery cell according to one embodiment of the present invention.

Referring to FIG. 3, a method of activating a battery cell according to the present invention includes: first-pressing a battery cell to initial-charge and discharge the battery cell under a pressurization condition for the battery cell (S10); exposing the battery cell to a vacuum condition (S20); second-pressing the battery cell (S30); aging the battery cell (S40); and degassing the battery cell by removing internal gas of the battery cell (S50). At this time, a pressure P2 applied to the battery cell during the second-pressing of the battery cell is lower than a pressure P1 applied to the battery cell during the first-pressing of the battery cell.

First, the battery cell may be a pouch-type unit cell. Specifically, the battery cell may be a pouch-type battery cell having a structure that an electrode assembly having a positive electrode/separator/negative electrode structure is embedded in an exterior material of the laminate sheet in a state that is connected to electrode leads formed outside the exterior material.

The positive electrode and the negative electrode are manufactured by coating a slurry such as an electrode active material, a binder resin, a conductive agent, and other additives on at least one surface of the current collector. In the case of a positive electrode, a general positive electrode active material such as a lithium-containing transition metal oxide is used as the electrode active material, and in the case of a negative electrode, a general negative electrode active material such as a lithium metal for intercalating and discharging lithium ions, a carbon material, and a metal compound, or a mixture thereof may be used as the electrode active material. The separator blocks a contact between the positive electrode and the negative electrode in order to prevent a short circuit therebetween, and a porous polymer film may be used to allow charge transfer during the charge and discharge.

The pouch case is formed as a first case and a second case, which are obtained by processing a sheet material to have a predetermined shape, are coupled to each other at an upper side and a lower side, respectively. The sheet material constituting the pouch case is composed of a multi-layer structure obtained by lamination of an outer resin layer made of an insulating material such as polyethylene terephthalate (PET) or nylon at the outermost side, a metal layer made of an aluminum material which maintains mechanical strength and prevents permeation of moisture and oxygen, and an interior resin layer made of a polyolefin-based material which functions as a sealing material by having thermal adhesiveness. On the other hand, a pouch case before the completion of the degassing process to be described later is manufactured as a size greater than the volume of the electrode assembly and has a receiving portion for accommodating an electrode assembly, and a gas pocket unit which forms a space for collection of the activation gas which is generated during the charge and discharge process.

Further, in the battery cell before the first-pressing step, a process of casing an electrode assembly in a pouch case, injecting an electrolyte solution into the pouch case, and impregnating the electrode assembly in the electrolyte solution is performed. In a specific example, the electrolyte solution is permeated into a space between the positive electrode, the negative electrode and the separator by capillary force. When the electrolyte solution injection is completed, the opening is sealed in order to completely seal the electrode assembly.

Further, after the sealing of the opening of the pouch case is completed, an activation process of charging and discharging the battery cell is performed. Since the battery cell in the initial period is a non-activated cell in a discharged state, it does not have a function as a battery. The activation process is a process of activating the cell in a discharged state by charging and discharging the cell a few times to be able to function as a battery.

In one example, the method of activating a battery cell according to the present invention includes first-pressing a battery cell to initial-charge and discharge the battery cell under a pressurization condition for the battery cell (S10). Further, since the initial charge and discharge process of the battery cell is performed by an electrochemical reaction, gas is generated as a side reaction during the charge and discharge process. At this time, since generated gas becomes the cause of the cell resistance increase, capacity and lifespan decrease, external appearance defect, it is necessary to remove gas after the charge and discharge process.

FIG. 4 is a diagram schematically showing a first-pressing step in a battery cell activation method according to one embodiment of the present invention.

As illustrated in FIG. 4, during the first-pressing step (S10), the battery cell 100, where a gas discharge path has been formed at one side or two sides, may discharge generated gas, and the gas inside the battery cell 100 may be discharged to the outside by pressing the battery cell 100 with the pressing jig 130. More specifically, the battery cell 100 includes a receiving portion 120b for accommodating an electrode assembly, and a gas pocket unit 120a which forms a space for collecting activation gas generated during the charge and discharge process. Further, the pressing jig 130 includes plates which have the battery cell 100 between the plates and press the battery cell 100 from two sides. Further, the electric current may pass through the electrode lead of the battery cell at the time of charging the battery cell.

In one example, the method of activating a battery cell according to the present invention includes exposing the battery cell to a vacuum condition (S20). The vacuum step of exposing of the battery cell to a vacuum condition (S20) is a process of inducing the interface interval between the electrode and the separator to be widened by expanding the battery cell by generating a pressure difference between the inside and the outside of the activated cell.

FIGS. 5 and 6 are diagrams schematically showing a state before and after a vacuum step in a battery cell activation method according to one embodiment of the present invention. Referring to FIGS. 5 and 6, the vacuum step (S20) is performed in a state that places the battery cell in the vacuum chamber 110. At this time, the width of the vacuum chamber 110 may be greater than that of the battery cell. Specifically, in the vacuum step, in the case of depressurizing the inside of the vacuum chamber 110, the battery cell may expand, and it is preferable that the width of the vacuum chamber 110 is a length which is sufficient for accommodating the expanded battery cell 110.

In a specific example, in the vacuum step (S20), the inside of the vacuum chamber 110 is depressurized in a state that places the battery cell 100 in the vacuum chamber 110. For example, in the above vacuum step, the pouch case is changed from a normal state to an expanded state by performing vacuum control for the inside of the vacuum chamber 110 for accommodating the activated cell, namely, making the inside of the vacuum chamber 110 become vacuum or setting the external pressure to be lower than the internal pressure of the pouch case by adjusting the vacuum degree. As such, the receiving portion 120b and the gas pocket unit 120a of the pouch case are expanded to swell in a direction perpendicular to the flat surface, and at the same time, an interface interval between the electrodes 3a and 3c and the separator 3b constituting the electrode assembly 3 is widened, thereby increasing the absorption of the electrolyte solution. Further, it is possible to maximize the resorption of the electrolyte solution which is discharged as the interface interval between the electrodes 3a and 3c and the separator 3b constituting the electrode assembly 3 is widened. Further, gas, which has been trapped between the interfaces, may be smoothly moved.

In another example, the exposing of the battery cell 100 to the vacuum condition (S20) includes repeating a venting process of discharging gas inside the chamber 110 n times in a state that the battery cell 100 is positioned in the chamber 110. Herein, the n is an integer between 2 and 50. In a specific example, repeating the venting process n times means repeating the process of making the inside of the chamber 110 become vacuum and the venting process of discharging gas n times. The process may be repeated 2 to 40 times, 2 to 30 times, 2 to 20 times or 2 to 10 times. By this process, the electrode assembly inside the battery cell 100 may maximize absorption of the electrolyte solution.

Next, the method of activating a battery cell according to the present invention includes second-pressing the battery cell (S30). The second-pressing step (S30) is a process for additionally removing gas which has not been discharged during the first-pressing step. In one example, a pressure P2 applied to the battery cell during the second-pressing of the battery cell is lower than a pressure P1 applied to the battery cell during the first-pressing of the battery cell. In a specific example, the pressure P1 applied to the battery cell during the first-pressing of the battery cell and the pressure P2 applied to the battery cell during the second-pressing of the battery cell satisfy a following condition 1:

[Condition 1]

$1.1 \leq P1/P2 \leq 10$

Herein, P1 denotes an average pressure (kgf/cm$^2$) which is applied to press the battery cell during the first-pressing of the battery cell, and P2 denotes an average pressure (kgf/cm$^2$) which is applied to press the battery cell during the second-pressing of the battery cell.

In a specific example, the pressure P1 applied to the battery cell during the first-pressing of the battery cell and the pressure P2 applied to the battery cell during the second-pressing of the battery cell may have a relationship that $1.1 \leq P1/P2 \leq 10$, $1.5 \leq P1/P2 \leq 8$, or $2 \leq P1/P2 \leq 5$.

Further, the pressure P2 applied to the battery cell during the second-pressing of the battery cell may be in a range of 0.5 to 1 kgf/cm$^2$ on average. The pressure P2 applied to the battery cell during the second-pressing of the battery cell is set to be lower than the pressure P1 applied to the battery cell during the first-pressing of the battery cell in order to prevent discharge of a large amount of electrolyte solution during the pressing process. Namely, in the method of activating a battery cell according to the present invention, as the first-pressing step and the second-pressing step satisfy the above condition 1, the discharge of gas inside the battery cell can be maximized, and the discharge of the electrolyte solution can be prevented.

FIG. 7 is a flowchart of a method of activating a battery cell according to another embodiment of the present invention.

Referring to FIG. 7, the second-pressing of the battery cell (S30) includes: pressing an opposite region of a side where a gas pocket of the battery cell has been formed (S31); and pressing a region of a side where the gas pocket of the battery cell has been formed (S32). Hereinafter, the second-pressing step will be described in detail with reference to FIG. 7.

FIGS. 8 and 9 schematically show a lower pressing step and a upper pressing step in a second-pressing step of a battery cell activation method according to another embodiment of the present invention.

Referring to FIGS. 8 and 9, the lower pressing step (S31) includes pressing the lower region based on the electrode lead of the pouch cell, and the upper pressing step (S32) includes pressing the upper region based on the electrode lead of the pouch cell. In a specific example, in the lower pressing step (S31), only the lower region of the battery cell is pressed so that gas, which is trapped in the lower portion of the battery cell, may be moved to the upper region. Next, in the upper pressing step (S31), only the upper region of the battery cell is pressed so that the gas, which is discharged from the lower region, may be moved to the gas pocket unit 120a. As such, gas inside the battery cell 100 may be easily discharged to the gas pocket unit 120a, and the gas discharge may be maximized.

At this time, the second-pressing of the battery cell (30) includes discharging internal gas of the battery cell 100 by sequentially pressing the battery cell 100 from one side to the other side. Herein, one side means an opposite region of a region where the gas pocket unit 120a is formed in the receiving portion 120b, and the other side means a region where the gas pocket is formed.

In a specific example, the second-pressing of the battery cell (S30) includes sequentially pressing the battery cell 100 from one side to the other side using a pressing roller. Specifically, activation gas may be induced to be moved in the direction of the gas pocket unit by applying certain pressure toward the region where the gas pocket of the pouch case has been formed using the roller.

Next, the method of activating a battery cell according to the present invention includes aging the battery cell (S40). The aging step may be a step of stabilizing the SEI film formed during the charging step.

In one example, the method includes degassing the battery cell by removing internal gas of the battery cell (S50). More specifically, the degassing process includes a process of forming a hole, which functions as a path, through which gas inside the pouch case may be discharged to the outside, by perforating at least part of the gas pocket. At this time, it is possible to form the degassing hole by punching the first and second cases all together in the gas pocket unit of the pouch case, but in this case, the possibility of the leakage of the electrolyte solution together with the gas through the degassing hole may increase. In the present example, the hole may be formed only on the gas pocket in order to reduce the possibility of leakage of electrolyte solution.

Further, the degassing step (S50) is a process of discharging the activation gas to the outside of the pouch case through the degassing hole by negative pressure by forming the vacuum state inside the chamber again.

The activation gas, which has been collected in the gas pocket unit, may be naturally discharged to the outside through the hole, but as shown in the present embodiment, if a vacuum state is formed in the chamber again, the gas discharge efficiency increases by the negative pressure, and the gas remaining in the electrode assembly may also be discharged.

Further, the present invention provides method of manufacturing a battery cell including the above-described process of activating a battery cell. In one example, the method of manufacturing a battery cell according to the present invention includes activating the battery cell using the above-described method of activating a battery cell. Further, the battery cell is a pouch-type battery cell and has a gas pocket connected to an inside of the battery cell at one side.

In a specific example, the method further includes sealing the battery cell and removing the gas pocket, after the activating of the battery cell.

The gas pocket is a space for collecting activation gas, and when the degassing process is completed, it is a dead space in the cell, and accordingly, after trimmed, a new sealing line is formed by heat-fusing the first case and the second case of the corresponding portion. Likewise, after the secondary-sealing is completed, a wing folding process of closely attaching the sealing line of the pouch case on the side surface of the pouch case by folding the sealing line may be added.

Hence, according to a method of activating a battery cell and a method of manufacturing a battery cell including the same of the present invention, gas, which is trapped between a separator and an electrode inside an electrode assembly of a battery cell, can be easily discharged. Further, in the activation method of the battery cell, it is possible to prevent discharge of a large amount of electrolyte solution during the pressing process of the battery cell by including first and second pressing steps.

While the present invention has been particularly shown and described with reference to exemplary embodiments thereof, it is to be understood that the present invention is not limited to the disclosed exemplary embodiments, and various changes and modifications may be made without departing from the technical idea of the present invention and the scope of the appended claims.

DESCRIPTION OF REFERENCE NUMERALS

1: battery cell
2: pouch case
2a: gas pocket unit
2: receiving portion
3: electrode assembly
3a, 3c: electrode
3b: separator
4: degassing hole
5: activation gas
11: chamber
100: battery cell
110: chamber
120a: gas pocket unit
120b: receiving portion
130: pressing jig

The invention claimed is:

1. A method of activating a battery cell, the method comprising:
injecting an electrolyte into a case of the battery cell;
first-pressing the battery cell to initial-charge and discharge the battery cell under a pressurization condition for the battery cell;
exposing the battery cell to a vacuum condition;
second-pressing the battery cell;
aging the battery cell; and
degassing the battery cell by removing internal gas of the battery cell,
wherein a pressure P2 applied to the battery cell during the second-pressing of the battery cell is lower than a pressure P1 applied to the battery cell during the first-pressing of the battery cell,
wherein the pressure P2 applied to the battery cell during the second-pressing of the battery cell is in a range of 0.5 to 3 kgf/cm$^2$ on average,
wherein the pressure P1 applied to the battery cell during the first-pressing of the battery cell and the pressure P2 applied to the battery cell during the second-pressing of the battery cell satisfy a following condition 1:

[Condition 1]

$2 \leq P1/P2 \leq 10$, wherein P1 denotes an average pressure (kgf/cm$^2$) which is applied to press the battery cell during the first-pressing of the battery cell, and
wherein P2 denotes an average pressure (kgf/cm$^2$) which is applied to press the battery cell during the second-pressing of the battery cell.

2. The method of claim 1, wherein the second-pressing of the battery cell includes:
pressing a first region on a side of the battery cell opposite to where a gas pocket of the battery cell has been formed; and
pressing a second region on a side of the battery cell where the gas pocket of the battery cell has been formed.

3. The method of claim 1, wherein the second-pressing of the battery cell includes discharging the internal gas of the battery cell by sequentially pressing the battery cell from a first side to a second side opposite the first side.

4. The method of claim 3, wherein the second-pressing of the battery cell is performed using a pressing roller.

5. The method of claim 1, wherein the exposing of the battery cell to the vacuum condition is performed by depressurizing an interior of a chamber in a state that the battery cell is positioned inside the chamber.

6. The method of claim 5, wherein the exposing of the battery cell to the vacuum condition is performed by repeating a venting process of discharging gas inside the chamber n times in the state that the battery cell is positioned in the chamber, and
wherein n is an integer between 2 and 50.

7. The method of claim 5, wherein a width of the vacuum chamber is greater than a width of the battery cell.

8. The method of claim 1, wherein the battery cell is a pouch-type battery cell and has a gas pocket connected to an inside of the battery cell at one side.

9. A method of manufacturing a battery cell, the method comprising:
activating the battery cell using the method of activating a battery cell according to claim 8; and
sealing the battery cell; and
removing the gas pocket, after the activating of the battery cell.

10. The method according to claim 1, wherein the exposing the battery cell to the vacuum condition occurs after the first-pressing the battery cell, and
wherein the second-pressing the battery cell occurs after the exposing the battery cell to the vacuum condition.

* * * * *